United States Patent
Li et al.

(10) Patent No.: US 11,104,839 B2
(45) Date of Patent: Aug. 31, 2021

(54) METHODS AND COMPOSITIONS FOR MITIGATING WATER PRODUCTION

(71) Applicant: SAUDI ARABIAN OIL COMPANY, Dhahran (SA)

(72) Inventors: Leiming Li, Sugar Land, TX (US); Rajesh Kumar Saini, Cypress, TX (US); Feng Liang, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/741,068

(22) Filed: Jan. 13, 2020

(65) Prior Publication Data

US 2020/0224077 A1    Jul. 16, 2020

Related U.S. Application Data

(60) Provisional application No. 62/791,271, filed on Jan. 11, 2019.

(51) Int. Cl.
*C09K 8/502* (2006.01)
*E21B 33/138* (2006.01)

(52) U.S. Cl.
CPC ............ *C09K 8/502* (2013.01); *E21B 33/138* (2013.01)

(58) Field of Classification Search
CPC ...................................................... E21B 33/10
See application file for complete search history.

(56) References Cited

U.S. PATENT DOCUMENTS

| | | |
|---|---|---|
| 3,762,476 A | 10/1973 | Gall |
| 3,881,552 A | 5/1975 | Hessert |
| 4,606,407 A | 8/1986 | Shu |
| 4,683,949 A | 8/1987 | Sydansk et al. |
| 4,706,754 A | 11/1987 | Smith |
| 5,131,469 A | 7/1992 | Lockhart et al. |
| 5,650,379 A | 7/1997 | Sydansk |
| 5,979,557 A | 11/1999 | Card et al. |
| 6,194,356 B1 | 2/2001 | Jones et al. |
| 7,345,011 B2 | 3/2008 | Nguyen et al. |
| 7,398,825 B2 | 7/2008 | Nguyen et al. |
| 7,501,385 B2 | 3/2009 | Davidson |
| 7,854,277 B2 | 12/2010 | Duncum et al. |
| 8,084,401 B2 | 12/2011 | Lukocs et al. |

(Continued)

FOREIGN PATENT DOCUMENTS

WO    2017213930 A1    12/2017

OTHER PUBLICATIONS

International Search Report and Written Opinion for related PCT application PCT/US2020/013357 dated May 12, 2020.

*Primary Examiner* — William D Hutton, Jr.
*Assistant Examiner* — Avi T Skaist
(74) *Attorney, Agent, or Firm* — Bracewell LLP; Constance Gall Rhebergen (57) ABSTRACT

Embodiments provide methods and compositions for mitigating water production for hydrocarbon recovery. According to an embodiment, the method involves a treatment fluid composition. The treatment fluid composition includes a base liquid, a gelling agent, and a crosslinking agent. The treatment fluid composition is introduced downhole where it is positioned in a high permeability streak adjacent to a wellbore. After crosslinking, the treatment fluid composition blocks water in the high permeability streak from penetrating into the wellbore.

17 Claims, 3 Drawing Sheets

(56) References Cited

U.S. PATENT DOCUMENTS

| | | | |
|---|---|---|---|
| 8,517,103 B1 | 8/2013 | Jamison et al. | |
| 8,728,989 B2 | 5/2014 | Kakadjian, Sr. et al. | |
| 2001/0018972 A1* | 9/2001 | Bayliss et al. | E21B 33/10 |
| | | | 166/292 |
| 2006/0037754 A1* | 2/2006 | Funkhouser | C09K 8/52 |
| | | | 166/308.1 |
| 2007/0173413 A1* | 7/2007 | Lukocs et al. | C09K 8/00 |
| | | | 507/238 |
| 2011/0088902 A1 | 4/2011 | Harrison et al. | |
| 2011/0290489 A1 | 12/2011 | Collins et al. | |
| 2013/0312977 A1* | 11/2013 | Lembcke | E21B 43/121 |
| | | | 166/311 |
| 2016/0369153 A1 | 12/2016 | Ali et al. | |
| 2018/0105733 A1 | 4/2018 | Mcmahon et al. | |

\* cited by examiner

METHODS AND COMPOSITIONS FOR MITIGATING WATER PRODUCTION

RELATED APPLICATION

The disclosure is related to, and claims priority from, U.S. Provisional Patent Application 62/791,271, filed on Jan. 11, 2019, the disclosure of which is incorporated herein by reference in its entirety.

BACKGROUND

1. Field

Embodiments generally relate to hydrocarbon recovery. More particularly, embodiments relate to methods and compositions for mitigating water production to facilitate hydrocarbon recovery.

2. Description of the Related Art

Water (or aqueous fluids) is often produced from oil and gas wells as a non-desirable byproduct, especially when the oil and gas wells are near subterranean water sources or the wells are located offshore. In such environments, it is inevitable to completely shut off the produced water. Because water cannot be completely shut off during certain hydrocarbon production operations, the produced water is subsequently separated from the produced hydrocarbons. Once the produced water is separated from the produced hydrocarbons, the water is disposed of in an environmentally-friendly manner.

In certain cases, water is produced in a greater amount such that the separation and the disposition of the produced water becomes burdensome in terms of hydrocarbon production. Here, the produced water is called "excess water" as known in the art.

A number of conventional means exist for controlling excess water production. In cases where excess water does not contain hazardous substances, it can be reinjected in disposal injection wells. The produce water can be used in hydraulic fracturing of a hydrocarbon-bearing formation. Also, the produced water can be disposed onshore or offshore. In cases where excess water contains hazardous substances, it is necessary to treat the excess water to remove those substances before conducting any subsequent reinjection or disposal events.

SUMMARY

Subterranean formations may contain fluids other than hydrocarbons. One example is water, where water can be produced along with hydrocarbons via a wellbore drilled from a surface that intersects the formation. The produced water can be reinjected into the formation or can be subject to disposal. However, without any post-production treatment, the produced water may negatively affect the environment, especially when the produced water contains hazardous substances. Also, excess water production may lead to downhole scale and pipe corrosion. Overall, the production of water negatively impacts the economy of hydrocarbon production due to increased cost and early abandonment of the field with hydrocarbon in place.

Attempts have been made to mitigate excess water production. Those include mechanical operations, such as plugging or sealing operations, and complex chemical operations that alter the water permeability of the formation. Chemical operations involving inorganic gels, resins, elastomers, monomer-based systems, polymer gels, ungelled polymers, viscous systems, and bio-polymers are commonly used to selectively reduce the water flow.

Among these chemical operations, ungelled polymers and viscous systems are collectively referred to as relative permeability modifiers (RPMs). An RPM generally includes one or more compounds injected into a formation that adsorb onto the rock surface thereby reducing the water permeability of the formation. RPMs can be effective in mitigating water production by reducing the water permeability relative to hydrocarbon permeability. However, the drawback is that RPM operations often suffer from reduced hydrocarbon permeability that negatively impacts hydrocarbon recovery.

Therefore, this disclosure presents embodiments related to methods and compositions for mitigating excess water production for hydrocarbon recovery. The methods and compositions disclosed here significantly reduce water permeability of a hydrocarbon-bearing formation. At the same time, these methods and compositions minimally reduce hydrocarbon permeability as opposed to RPMs.

Embodiments of this disclosure provide a method for mitigating water production for hydrocarbon recovery. The method includes the step of introducing a first base liquid, a gelling agent, and a crosslinking agent into a hydrocarbon-bearing formation via a wellbore. At least two of the first base liquid, the gelling agent, and the crosslinking agent form a mixture in the hydrocarbon-bearing formation. The method includes the step of maintaining the mixture under formation conditions such that a gelled treatment fluid is formed. The gelling agent and the crosslinking agent form a crosslinked network of molecules. At least a portion of the first base liquid is incorporated in the crosslinked network. The gelled treatment fluid reduces water permeability of the hydrocarbon-bearing formation and inhibits water from permeating from the hydrocarbon-bearing formation.

In some embodiments, the gelling agent and the crosslinking agent are combined in a ratio from 1:100 to 100:1 by volume.

In some embodiments, the water permeability of the hydrocarbon-bearing formation is greater than 100 millidarcies.

In some embodiments, the first base liquid is hydrocarbon based.

In some embodiments, the first base liquid includes diesel, biodiesel, crude oil, kerosene, gas oil, fuel oil, hydrotreated oil, mineral oil, paraffinic oil, fatty acids, olefins, alkanes, aromatics solvents, esters, acetals, ethers, siloxanes, and combinations of the same.

In some embodiments, the first base liquid is mineral oil.

In some embodiments, the method further includes the step of introducing a second base liquid into the hydrocarbon-bearing formation via the wellbore. The second base liquid is chemically different from the first base liquid. In some embodiments, at least a portion of the second base liquid is incorporated in the crosslinked network.

In some embodiments, the gelling agent includes phosphate esters, phosphonate esters, phosphoric acid esters, fatty acid soaps, and combinations of the same.

In some embodiments, the crosslinking agent includes atoms having aluminum, iron, chromium, zirconium, titanium, boron, and combinations of the same.

In some embodiments, the method further includes the step of introducing an additive into the hydrocarbon-bearing formation via the wellbore. The additive is configured to increase the viscosity of the gelled treatment fluid.

In some embodiments, the method further includes the step of introducing an additive into the hydrocarbon-bearing formation via the wellbore. The additive is configured to delay viscosity breaking of the gelled treatment fluid.

In some embodiments, the method further includes the step of introducing an additive into the hydrocarbon-bearing formation via the wellbore such that in the maintaining step, the additive is configured to delay for a period of time the gelling agent and the crosslinking agent from forming the crosslinked network.

In some embodiments, the method further includes the step of introducing an additive into the hydrocarbon-bearing formation via the wellbore. The additive is acidic and is configured to buffer and neutralize basic substances present in the treatment fluid composition.

In some embodiments, the method includes the step of introducing an additive into the hydrocarbon-bearing formation via the wellbore. The additive is configured to absorb water.

Embodiments of this disclosure provide a treatment fluid composition for mitigating water production for hydrocarbon recovery. The treatment fluid composition includes a base liquid, a gelling agent, and a crosslinking agent. The gelling agent and the crosslinking agent is configured to form a crosslinked network of molecules. At least a portion of the base liquid is incorporated in the crosslinked network. The treatment fluid composition is configured to reduce water permeability of a hydrocarbon-bearing formation to inhibit water from permeating from the hydrocarbon-bearing formation.

In some embodiments, the gelling agent and the crosslinking agent are combined in a ratio from 1:100 to 100:1 by volume.

In some embodiments, the water permeability of the hydrocarbon-bearing formation is greater than 100 millidarcies.

In some embodiments, the base liquid is hydrocarbon based.

In some embodiments, the base liquid includes diesel, biodiesel, crude oil, kerosene, gas oil, fuel oil, hydrotreated oil, mineral oil, paraffinic oil, fatty acids, olefins, alkanes, aromatics solvents, esters, acetals, ethers, siloxanes, and combinations of the same.

In some embodiments, the base liquid is mineral oil.

In some embodiments, the gelling agent includes phosphate esters, phosphonate esters, phosphoric acid esters, fatty acid soaps, and combinations of the same.

In some embodiments, the crosslinking agent includes atoms having aluminum, iron, chromium, zirconium, titanium, boron, and combinations of the same.

In some embodiments, the treatment fluid composition further includes an additive. The additive is configured to increase the viscosity of the treatment fluid composition.

In some embodiments, the treatment fluid composition further includes an additive. The additive is configured to delay viscosity breaking of the treatment fluid composition.

In some embodiments, the treatment fluid composition further includes an additive. The additive is configured to delay for a period of time the gelling agent and the crosslinking agent from forming the crosslinked network.

In some embodiments, the treatment fluid composition further includes an additive. The additive is acidic and is configured to buffer and neutralize basic substances present in the treatment fluid composition.

In some embodiments, the treatment fluid composition further includes an additive. The additive is configured to absorb water.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

In the accompanying Figures, similar components or features, or both, may have a similar reference label.

DETAILED DESCRIPTION

The disclosure refers to particular features, including compositions, processes, or method steps. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the various embodiments have been described in detail, it should be understood that various changes, substitutions, and alternations can be made without departing from the principle and scope of these embodiments. Accordingly, the scope of the various embodiments should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

Optional or optionally means that the subsequently described event or circumstances can or may not occur. The description includes instances where the event or circumstance occurs and instances where it does not occur.

Where a range of values is provided in the specification or in the appended claims, it is understood that the interval encompasses each intervening value between the greater limit and the lesser limit as well as the greater limit and the lesser limit. The disclosure encompasses and bounds smaller ranges of the interval subject to any specific exclusion provided. "Substantial" means equal to or greater than 1% by the indicated unit of measure. "Significant" means equal to or greater than 0.1% of the indicated unit of measure. "Detectable" means equal to or greater than 0.01% by the indicated unit of measure.

Where reference is made in the specification and appended claims to a method comprising two or more defined steps, the defined steps can be carried out in any order or simultaneously except where the context excludes that possibility.

As used throughout the disclosure, terms such as "first" and "second," are arbitrarily assigned and are merely intended to differentiate between two or more elements of a method. It is to be understood that the words "first" and "second" serve no other purpose and are not part of the name or description of the element, nor do they necessarily define a relative sequence of the element. Furthermore, it is to be understood that the mere use of the term "first" and "second" does not require that there be any "third" component, although that possibility is contemplated under the scope of the present disclosure.

As used throughout the disclosure, spatial terms describe the relative position of an object or a group of objects relative to another object or group of objects. The spatial relationships apply along vertical and horizontal axes. Orientation and relational words, including "uphole," "downhole," and other like terms, are for descriptive convenience and are not limiting unless otherwise indicated.

As used throughout the disclosure, the term "water" can include, for example, fresh water, a brine, a connate water, surface water, produced water, distilled water, carbonated water, produced water, pond water, ground water, treated municipal waste water, sea water, treated water, and combinations of the same.

As used throughout the disclosure, the term "adjacent to a wellbore" refers to an area on, in, near, or surrounding the intersection between the wellbore wall and the formation. An example of an area adjacent to a wellbore may include an area shown in FIG. 1 where a crosslinked treatment fluid composition 160 is positioned adjacent to a wellbore 100. Embodiments disclosed here are examples of a treatment fluid composition that are used in a wellbore that significantly reduces at least one of water production and water permeability while minimally sacrificing hydrocarbon permeability. The treatment fluid composition minimally affects hydrocarbon permeability because the treatment fluid composition is hydrocarbon-based and components of the treatment fluid composition have relatively lesser molecular weight compared to that of polymers in polymer-based fracking fluids. The treatment fluid composition is also used to mitigate water production from a hydrocarbon-bearing formation.

In some embodiments, the treatment fluid composition includes a mixture of a base liquid, a gelling agent, and a crosslinking agent. Optionally, an additive can be included in the treatment fluid composition. It is within the capability of those skilled in the art to determine molar ratios between the base liquid, the gelling agent, the crosslinking agent, and the optional additive.

In some embodiments, the treatment fluid composition includes a base liquid which includes a hydrocarbon-based fluid. The base liquid is hydrophobic such that the base liquid is sparingly soluble or slightly soluble with water. The base liquid is hydrophobic such that the base liquid is sparingly soluble or slightly soluble with water originating from the hydrocarbon-bearing formation. On the other hand, the base liquid is hydrophobic such that the base liquid can be miscible with any hydrocarbons originating from the hydrocarbon-bearing formation. Non-limiting examples of the base liquid include diesel, biodiesel, crude oil, kerosene, gas oil, fuel oil, hydrotreated oil, mineral oil, paraffinic oil, fatty acids (including saturated fatty acids and unsaturated fatty acids), olefins (including α-olefins, internal olefins, and polyolefins), alkanes (including cycloalkanes), aromatics solvents, esters (including carbonate esters such as dialkyl carbonate), acetals, ethers, and combinations of the same. In some embodiments, the base liquid may include siloxanes (including silicone oil and organosiloxanes).

In some embodiments, the treatment fluid composition includes a gelling agent. The gelling agent includes phosphate esters and phosphonate esters. Non-limiting examples of phosphate esters include compounds having phosphate monoesters, symmetric diesters, asymmetric diesters, symmetric triesters, and asymmetric triesters. These phosphate esters can have hydrocarbon sidechains that are aliphatic, whether saturated or unsaturated, whether cyclic or open-chain, or aromatic. Non-limiting examples of phosphonate esters include compounds having phosphonate monoester and phosphonate diesters. These phosphonate esters can have hydrocarbon sidechains that are aliphatic, whether saturated or unsaturated, whether cyclic or open-chain, or aromatic. Non-limiting commercial examples of suitable phosphate esters include ECONO OG-1 from Economy Polymers and Chemicals (Houston, Tex.) and EG-2 from Ethox Chemicals (Greenville, S.C.). Non-limiting examples of phosphate esters are disclosed in U.S. Pat. Appl. Pub. No. 2017/0349815, which is incorporated in this disclosure by reference in its entirety. Non-limiting examples of phosphoric acid esters (a phosphate ester having two ester groups and one hydroxyl group) include phosphoric acid esters having the formula:

where R includes a hydrocarbon group having from about 1 to about 30 carbon atoms that may include a linear or branched alkyl, alkenyl, aryl, alkylaryl, arylalkyl, cycloalkyl, alkyl ether, aryl ether, alkyl aryl ether, or combinations of the same. R' includes a hydrocarbon group having from about 1 to about 6 carbon atoms. In some embodiments, R is a relatively small group compared to R', which may include a larger hydrocarbon group similar to that listed above with respect to R such as linear or branched alkyl, alkenyl, aryl, alkylaryl, arylalkyl, cycloalkyl, alkyl ether, aryl ether, alkyl aryl ether group, or combinations of the same that may have about 1 to about 30 carbon atoms. Non-limiting examples of phosphorous-based gelling agents include phosphorous-based gelling agents having the formula:

where X includes an $OR^1$, $NR^1R^2$, or $SR^1$ group, $R^1$ being an organic group having 2-24 carbon atoms, and $R^2$ being an organic group or a hydrogen. Y includes an $NR^3R^4$ or $SR^3$ group, $R^3$ an organic group having 2-24 carbon atoms, and $R^4$ an organic group or a hydrogen. In other embodiments, the gelling agent includes a non-phosphorous-based gellant. Non-limiting examples of a non-phosphorous-based gellants include non-phosphorous-based gellants having the formula:

where x and y are from about 5 to about 54 and M is a multivalent metal such as aluminum, iron, cobalt, zirconium, and combinations of the same, or is an oxo-metal or metal alkoxide complexed to a fatty acid. Still in other embodiments, the non-phosphorous-based gellant may include fatty acid soaps. The fatty acid soaps may include metal cations.

In some embodiments, the treatment fluid composition includes a crosslinking agent. The crosslinking agent is used for crosslinking the treatment fluid composition. The crosslinking agent is hydrophilic in nature, but also can be regularly dispersible in a hydrophobic environment. Upon a triggering event, the crosslinking molecules of the crosslinking agent chemically links themselves to the gelling agent to form a three dimensional network of interconnected (that is, crosslinked) molecules. At least a portion of the base liquid is incorporated within the crosslinked network, such that the base liquid molecules become immobilized leading to an increase of viscosity. As a result, the crosslinked treatment fluid composition ceases to exhibit fluid-type behavior and becomes an immobile gel. It is known in the art that varying the concentrations of the crosslinking agent is a way to control the permeability and strength of the gelled treatment fluid composition. Without being bound by any theory, increasing the concentration of the crosslinking agent may enhance the strength of the gelled treatment fluid composition up to a point where excess crosslinking results in a loss in viscosity. Similarly, without being bound by any theory, increasing the concentration of the gelling agent may enhance the strength of the gelled treatment fluid composition. One skilled in the art may vary the gelling agent concentration and the crosslinking agent concentration to reach an optimum ratio exhibiting maximum gel strength. In some embodiments, the gelling agent and the crosslinking agent is combined in a ratio from about 1:100 by volume to about 100:1 by volume. In other embodiments, the gelling agent and the crosslinking agent is combined in a ratio from about 1:10 by volume to about 10:1 by volume. Yet in other embodiments, the gelling agent and the crosslinking agent is combined in a ratio from about 1:5 by volume to about 5:1 by volume. Deviation from the optimum condition may result in a gelled treatment fluid composition having a relatively lesser gel strength, such as when the crosslinking agent concentration is lesser than that of the optimum ratio.

In some embodiments, the crosslinking agent includes metallic crosslinkers. The metallic crosslinkers may include metal or metalloid cations or organometallic ions that may form ionic bonds upon crosslinking. The metallic crosslinkers may include metal or metalloid cations or organometallic ions that may form chelates upon crosslinking. The metallic crosslinkers may include organometallic groups that may form covalent bonds upon crosslinking. Non-limiting examples of metallic crosslinkers include compounds having metal atoms such as aluminum, iron, chromium, zirconium, and titanium, and metalloid atoms such as boron. Non-limiting commercial examples of suitable metallic crosslinkers include ECONO OG-XL from Economy Polymers and Chemicals (Houston, Tex.) and EA-3 from Ethox Chemicals (Greenville, S.C.). Non-limiting examples of metallic crosslinkers are disclosed in U.S. Pat. Appl. Pub. No. 2017/0349815, which is incorporated in this disclosure by reference in its entirety. In some embodiments, the metallic crosslinkers include ferric salts having iron(III) as a cation. Non-limiting examples of ferric salts include compounds having iron(III) cations, ammonium cations, ammonia, amine groups, carboxylic acid groups, citrate, citric acid, and combinations of the same. In some embodiments, the metallic crosslinker may include a metal salt of aluminum. In some embodiments, the metallic crosslinker may include aluminum chloride, aluminum isopropoxide, or combinations of the same. In some embodiments, the metallic crosslinker may include aluminum alkanoate. Aluminum alkanoates include aluminum alkyl tricarboxylate salts, such as those having alkyl groups of from 1 to 40 carbon atoms, from 1 to 20 carbon atoms, from 5 to 20 carbon atoms, or from 5 to 10 carbon atoms, for example. The alkyl groups of the aluminum alkanoates may include saturated, straight, or branched hydrocarbon chains. A non-limiting example of an aluminum alkanoate is aluminum tris(2-ethylhexanoate), also known as aluminum octoate.

Figure 1:
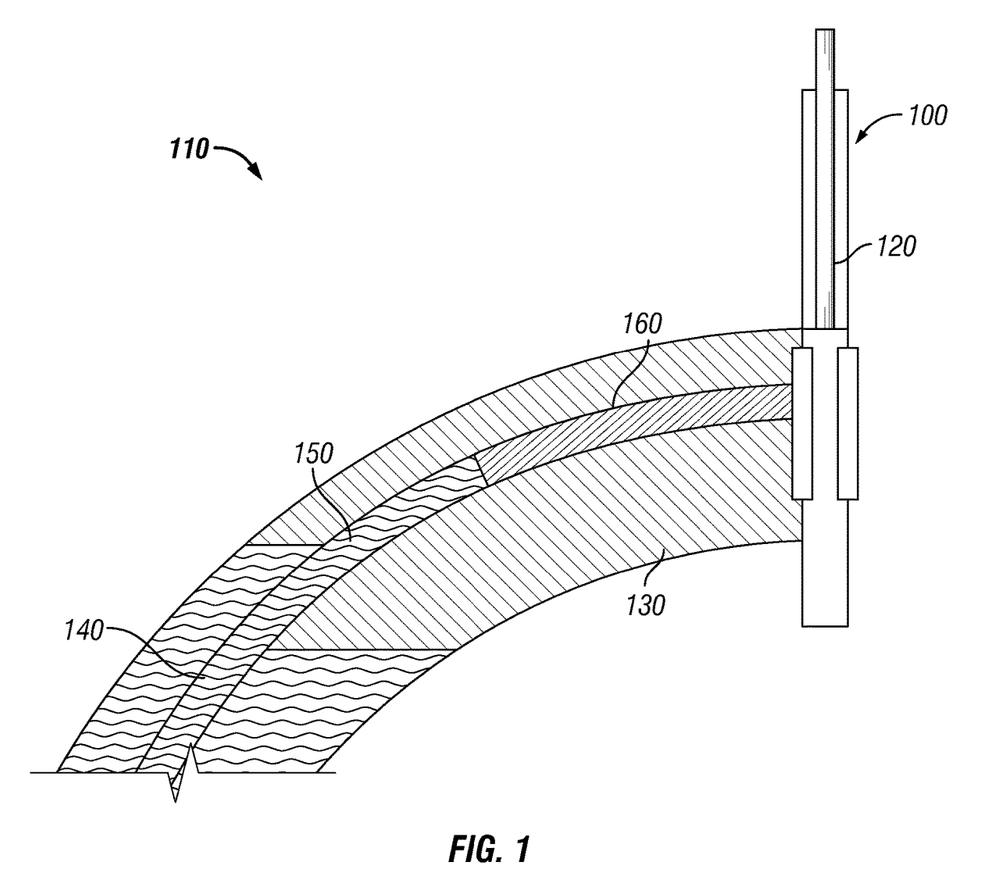
FIG. 1 is a schematic representation of a crosslinked treatment fluid composition positioned in a high permeability streak adjacent to a producing well in accordance with an embodiment of this disclosure.

In some embodiments, the crosslinked treatment fluid composition can be removed by a shearing force in a hydrophobic environment. The shearing force can be provided for example by applying positive hydraulic pressure into the wellbore. The shearing force may cause physical erosion to the crosslinked treatment fluid composition positioned in a high permeability streak adjacent to the wellbore, such as shown in FIG. 1. The resulting particles of the crosslinked treatment fluid composition can be transported back to the surface via the wellbore along with the produced hydrocarbon.

In some embodiments, the treatment fluid composition includes an optional viscosity-enhancing additive to enhance its performance of inhibiting water production. The treatment fluid composition may include viscosity-enhancing additives to increase the viscosity of the fluid composition. The treatment fluid composition may include viscosity-enhancing additives to mitigate any fluid leakoff issue. As used throughout this disclosure, a fluid leakoff refers to a phenomenon where excess fluid pressure exerted to a hydrocarbon-bearing formation causes fluid to be forced into the hydrocarbon-bearing formation. The fluid can be flowing into pore spaces of a rock. The fluid can be flowing into cracks opened and propagated into the hydrocarbon-bearing formation by the exerted fluid pressure. Typically, a pressure integrity test (PIT) or a leakoff test (LOT) is conducted to determine the strength of the rock. A real-time plot of injected fluid versus fluid pressure is obtained during the test. For most wellbores, the plot exhibits a straight line indicating a stable region. The leakoff refers to a point of permanent deflection starting from the end of that straight line of the plot. Non-limiting examples of the viscosity-enhancing additive include clay. In some embodiments, the clay includes montmorillonite. Montmorillonite is a smectite clay including phyllosilicate mineral with the repeating formula $(Na,Ca)_{0.33}(Al,Mg)_2(Si_4O_{10})(OH)_2 \cdot nH_2O$. Non-limiting commercial examples of suitable montmorillonite clay include Aluminum Pillared Clay from Sigma Aldrich (St. Louis, Mo.), M-I Gel® Wyoming clay (Wyoming bentonite sodium montmorillonite clay) from MI Swaco (Houston, Tex.), and Cloisite® nanoclay from BYK Additives and Instruments (Wesel, Germany). Non-limiting examples of the viscosity-enhancing additives also include graphite, carbon nanotubes, graphene, and nanoparticles having metallic oxide such as $TiO_2$.

In some embodiments, the treatment fluid composition includes an optional acidic additive. The acidic additive, due to its relatively hydrophilic nature, can be emulsified, suspended, or dispersed in the hydrophobic treatment fluid composition. The acidic additive can be solidified acid particles emulsified, suspended, or dispersed in the treatment fluid composition. Non-limiting examples of the acidic additive include hydrochloric acid, acetic acid, lactic acid, formic acid, and sulfamic acid. Non-limiting examples of the acidic additive also include solid acid forms of benzoic acid, lactic acid, and glycolic acid. The presence of basic substances such as sodium hydroxide and sodium carbonate may undo the crosslinking or at least structurally weaken the crosslinked molecules of the treatment fluid composition. Because the crosslinked treatment fluid composition can be susceptible to basic substances, the addition of the acidic additive may buffer and neutralize any basic substances present in the treatment fluid composition. This way the crosslinked molecules are protected from any undoing of the crosslinking or any structural weakening of the crosslinked molecules.

In some embodiments, the treatment fluid composition includes an optional water-absorbing additive. The water-absorbing additive can be dissolved, emulsified, suspended, or dispersed in the treatment fluid composition. Due to viscous fingering, at least a portion of water penetrating into or through the hydrophobic, crosslinked treatment fluid composition can be absorbed by the water-absorbing additive. This way the integrity of the treatment fluid composition can be maintained. Non-limiting examples of the water-absorbing additive include superabsorbent polymers and polymers and copolymers having acrylamide monomer units. As used throughout this disclosure, a superabsorbent polymer is a polymer that can absorb and retain liquid in an amount greater than its own weight. In some embodiments, superabsorbent polymers can absorb and retain water in an amount between 50 and 1,000 times their own weight. A non-limiting example of a superabsorbent polymer is hydrogel, where hydrogel may absorb water more than one hundred times of its own weight. Non-limiting examples of superabsorbent polymers include homopolymers and copolymers of acrylamide, acrylic acid, ethylene maleic anhydride, vinyl alcohol, ethylene oxide, and acrylonitrile, and carboxymethylcellulose. Non-limiting examples of superabsorbent polymers include starch-grafted copolymers of acrylamide, acrylic acid, and acrylonitrile.

In some embodiments, the treatment fluid composition includes an optional hydrocarbon-soluble additive. The hydrocarbon-soluble additive can be dissolved in the treatment fluid composition. The hydrocarbon-soluble additive may increase the viscosity of the treatment fluid composition. On the other hand, the hydrocarbon-soluble additive minimally impacts hydrocarbon permeability of the hydrocarbon-bearing formation because the hydrocarbon-soluble additive is hydrocarbon-based and has relatively lesser molecular weight compared to that of polymers in polymer-based fracking fluids. The hydrocarbon-soluble additive may gradually dissolve in hydrophobic substances. Non-limiting examples of the hydrocarbon-soluble additive include hydrocarbon-soluble polyurethanes, hydrocarbon-soluble phenolic resins, hydrocarbon-soluble cements, and hydrocarbon-soluble silicones.

In an example of operation, the treatment fluid composition is introduced downhole into a wellbore. The treatment fluid composition can be positioned in a high permeability streak adjacent to a wellbore. As used throughout this disclosure, a high permeability streak has a relatively greater permeability enough for subterranean water to pass through in wellbore conditions without added pressure. In some embodiments, a high permeability streak may have a permeability of greater than 100 millidarcies (mD), greater than 1,000 mD, or greater than 10,000 mD. After crosslinking, the treatment fluid composition, being a hydrophobic and immobile gel, is configured to block any water from penetrating into the wellbore thereby minimizing water production.

In some embodiments, the treatment fluid composition is designed to have the crosslinking event occur at a desired location in or near the high permeability streak adjacent to the wellbore, or in the hydrocarbon-bearing formation. The crosslinking provides a seal designed to prevent water production. In an example embodiment, the base liquid and the gelling agent can be combined to form a first mixture. The first mixture may include the crosslinking agent. The first mixture is introduced downhole into the wellbore. A second mixture is introduced downhole into the wellbore. The second mixture includes the crosslinking agent. In some embodiments, the same base liquid used to form the first mixture and the crosslinking agent can be combined to form the second mixture. In other embodiments, a base liquid different from the one used to form the first mixture, and the crosslinking agent can be combined to form the second mixture. The crosslinking agent is emulsified, suspended, or dispersed in the base liquid. The first mixture and the second mixture are introduced into the wellbore separately and sequentially. In this example embodiment, the first mixture is introduced into the wellbore before the second mixture. The crosslinking event occurs when the first mixture and the second mixture are combined downhole at the desired location. In another example embodiment, the first mixture and the second mixture can be introduced into the wellbore concurrently given that the crosslinking of the treatment fluid composition can be controlled and delayed until the treatment fluid composition reaches the desired location downhole. Yet in another example embodiment, the second mixture is introduced into the wellbore before the first mixture. The crosslinking agent adsorbs onto pore surfaces of the hydrocarbon-bearing formation and accumulates in pore spaces. Subsequently, the first mixture is introduced into the wellbore. The second mixture and the first mixture are introduced into the wellbore separately and sequentially. The crosslinking event occurs when the crosslinking agent preexisting in pore surfaces and pore spaces encounters the subsequently introduced gelling agent.

FIG. 1 is a schematic representation of a crosslinked treatment fluid composition 160 positioned in a high permeability streak 150 adjacent to a producing well in accordance with an embodiment of this disclosure. A wellbore 100 is intersecting a hydrocarbon-bearing formation 110. Production tubing 120 is shown deployed within the wellbore 100 where hydrocarbons 130 are produced. Water 140 can be located in the high permeability streak 150 that also intersects the wellbore 100. Absent the treatment fluid composition 160, the water 140 can penetrate into the wellbore 100 and become produced along with the hydrocarbons 130.

To minimize production of water 140, the treatment fluid composition 160 is positioned in the water-penetrating high permeability streak 150 adjacent to the wellbore 100. The treatment fluid composition 160 is crosslinked such that it may form an immobile gel. Because the crosslinked treatment fluid composition 160 is hydrophobic and does not exhibit fluid-type behavior, water 140 is blocked and no longer becomes produced via the high permeability streak 150.

This disclosure is illustrated by the following examples, which are presented for illustrative purposes only, and are not intended as limiting the scope of the invention which is defined by the appended claims.

In example embodiments of the present disclosure, a number of tests were run to show that the gelled, crosslinked treatment fluid composition exhibits sufficient degree of viscosity. A number of tests were run to show that the gelled, crosslinked treatment fluid composition exhibits viscosity that is adjustable.

Example 1

In one example embodiment, the treatment fluid composition was prepared with 100 to 500 milliliters (ml) of mineral oil (M5049 by Finoric, Houston, Tex.) having a flash point of greater than 210° F. mixed with 8 gallons per thousand gallons (gpt) of a phosphate ester-based gelling agent (ECONO OG-1 by Economy Polymers and Chemicals, Houston, Tex.), and 8 gpt of an iron-based crosslinking agent (ECONO OG-XL by Economy Polymers and Chemicals, Houston, Tex.). After mixing, the treatment fluid composition was heated to 250° F. Viscosity was measured using a viscometer (M5600 HPHT Rheometer by Grace Instrument Company, Houston, Tex.).

Figure 2:
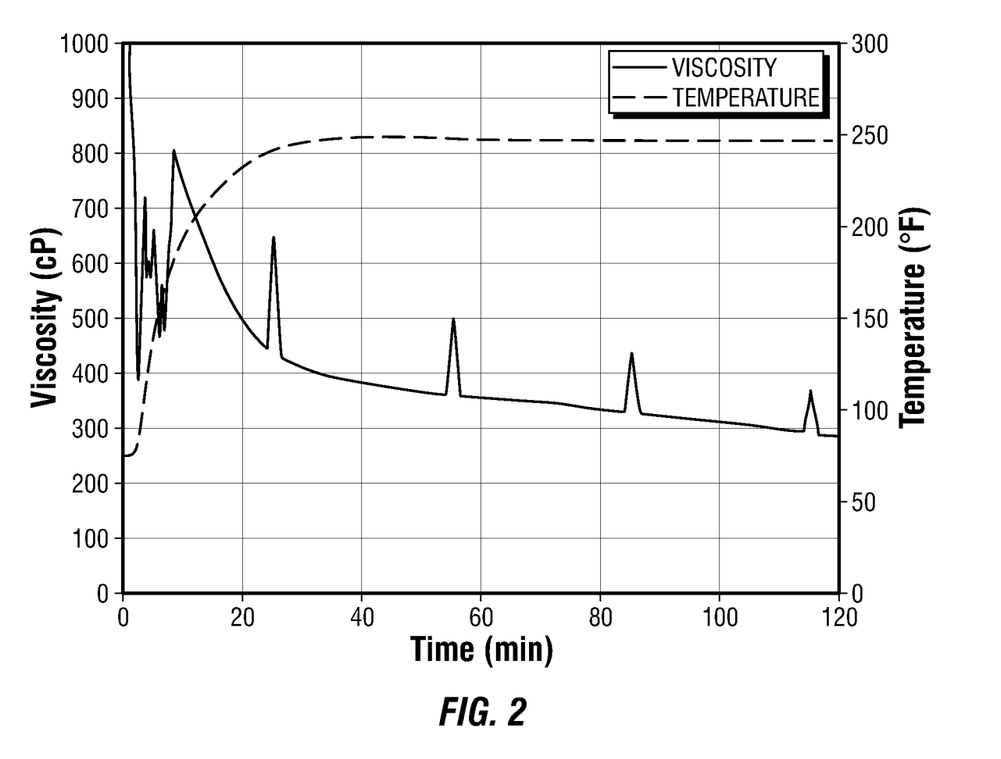
FIG. 2 is a graphical representation of viscosity and temperature versus time of a treatment fluid composition in accordance with an embodiment of this disclosure.

As shown in FIG. 2, the viscosity of the crosslinked treatment fluid composition was maintained greater than about 300 centipoise (cP) for at least 100 minutes at a shear rate of 100 $s^{-1}$.

Example 2

In one example embodiment, the treatment fluid composition was prepared with 100 to 500 ml of mineral oil (M5049 by Finoric, Houston, Tex.) having a flash point of greater than 210° F. mixed with 16 gpt of the phosphate ester-based gelling agent (ECONO OG-1 by Economy Polymers and Chemicals, Houston, Tex.), and 16 gpt of the iron-based crosslinking agent (ECONO OG-XL by Economy Polymers and Chemicals, Houston, Tex.). After mixing, the treatment fluid composition was heated to 250° F. Viscosity was measured using a viscometer (M5600 HPHT Rheometer by Grace Instrument Company, Houston, Tex.).

Figure 3:
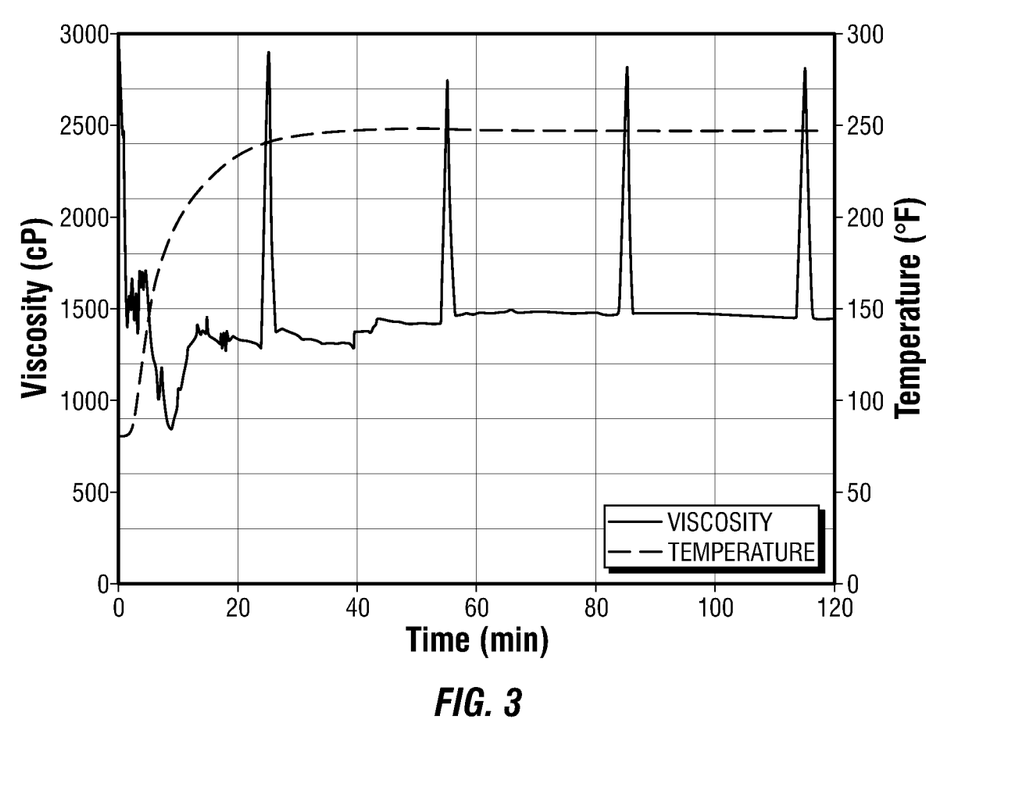
FIG. 3 is a graphical representation of viscosity and temperature versus time of a treatment fluid composition in accordance with an embodiment of this disclosure.

As shown in FIG. 3, the viscosity of the crosslinked treatment fluid composition was maintained greater than about 1,400 cP for at least 120 minutes at a shear rate of 100 $s^{-1}$.

Examples 1 and 2 suggest that the viscosity of the treatment fluid composition can be adjusted by altering the quantities of the gelling agent and the crosslinking agent.

Example 3

In one example embodiment, the treatment fluid composition was prepared with 100 to 500 ml of mineral oil (M5049 by Finoric, Houston, Tex.) having a flash point of greater than 210° F. mixed with 16 gpt of the phosphate ester-based gelling agent (ECONO OG-1 by Economy Polymers and Chemicals, Houston, Tex.) and 16 gpt of an iron-based crosslinking agent (ECONO OG-XL by Economy Polymers and Chemicals, Houston, Tex.). After mixing at room temperature, a firm gel was formed. Subsequently, about 10 ml of the firm gel was mechanically sheared in the presence of 100 ml of mineral oil.

Example 3 suggests that the crosslinked treatment fluid composition can be removed by a shearing force in a hydrophobic environment. The shearing force can be provided for example by applying positive hydraulic pressure into the wellbore. The shearing force may cause physical erosion to the crosslinked treatment fluid composition positioned in a high permeability streak adjacent to the wellbore, such as shown in FIG. 1. The resulting particles of the crosslinked treatment fluid composition can be transported back to the surface via the wellbore along with the produced hydrocarbon.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method for mitigating water production for hydrocarbon recovery, the method comprising the steps of:
   introducing a first base liquid, a gelling agent, and a crosslinking agent into a hydrocarbon-bearing formation via a wellbore, where at least two of the first base liquid, the gelling agent, and the crosslinking agent form a mixture in the hydrocarbon-bearing formation;
   introducing montmorillonite clay into the hydrocarbon-bearing formation via the wellbore;
   maintaining the mixture under formation conditions such that a gelled treatment fluid is formed, where the gelling agent and the crosslinking agent form a crosslinked network of molecules, and where at least a portion of the first base liquid is incorporated in the crosslinked network,
   where the gelled treatment fluid reduces water permeability of the hydrocarbon-bearing formation and inhibits water from permeating from the hydrocarbon-bearing formation,
   where the gelling agent is selected from the group consisting of: a phosphonate ester, a phosphoric acid ester, a fatty acid soap, and combinations of the same,
   where the montmorillonite clay increases the viscosity of the gelled treatment fluid.

2. The method of claim 1, where the gelling agent and the cros slinking agent are combined in a ratio from 1:100 to 100:1 by volume.

3. The method of claim 1, where the water permeability of the hydrocarbon-bearing formation is greater than 100 millidarcies.

4. The method of claim 1, where the first base liquid is hydrocarbon based.

5. The method of claim 1, where the first base liquid is selected from the group consisting of: diesel, biodiesel, crude oil, kerosene, gas oil, fuel oil, hydrotreated oil, mineral oil, paraffinic oil, fatty acids, olefins, alkanes, aromatics solvents, esters, acetals, ethers, siloxanes, and combinations of the same.

6. The method of claim 1, where the first base liquid is mineral oil.

7. The method of claim 1, further comprising the step of:
introducing a second base liquid into the hydrocarbon-bearing formation via the wellbore, where the second base liquid is chemically different from the first base liquid.

8. The method of claim 7, where at least a portion of the second base liquid is incorporated in the crosslinked network.

9. The method of claim 1, where the gelling agent is the phosphonate ester selected from the group consisting of: phosphonate monoester, phosphonate diester, and combinations of the same.

10. The method of claim 1, where the crosslinking agent includes atoms selected from the group consisting of: aluminum, iron, chromium, zirconium, titanium, boron, and combinations of the same.

11. The method of claim 1, further comprising the step of:
introducing an additive into the hydrocarbon-bearing formation via the wellbore, where the additive is configured to delay viscosity breaking of the gelled treatment fluid.

12. The method of claim 1, further comprising the step of:
introducing an additive into the hydrocarbon-bearing formation via the wellbore such that in the maintaining step, the additive is configured to delay for a period of time the gelling agent and the crosslinking agent from forming the crosslinked network.

13. The method of claim 1, further comprising the step of:
introducing an additive into the hydrocarbon-bearing formation via the wellbore, where the additive is acidic and is configured to buffer and neutralize basic substances present in the treatment fluid composition.

14. The method of claim 1, further comprising the step of:
introducing an additive into the hydrocarbon-bearing formation via the wellbore, where the additive is configured to absorb water.

15. The method of claim 1, where the gelling agent is the phosphoric acid ester having the formula:

where R includes a hydrocarbon group having from 1 to 30 carbon atoms and R' includes a hydrocarbon group having from about 1 to about 6 carbon atoms, where each of R and R' includes a linear or branched alkyl, alkenyl, aryl, alkylaryl, arylalkyl, cycloalkyl, alkyl ether, aryl ether, alkyl aryl ether, or combinations of the same.

16. The method of claim 1, where the gelled treatment fluid further comprises:

where X includes an $OR^1$, $NR^1R^2$, or $SR^1$ group, $R^1$ being an organic group having 2 to 24 carbon atoms, and $R^2$ being an organic group or a hydrogen, and Y includes an $NR^3R^4$ or $SR^3$ group, $R^3$ being an organic group having 2 to 24 carbon atoms, and $R^4$ being an organic group or a hydrogen.

17. The method of claim 1, further comprising the step of:
applying a positive hydraulic pressure into the wellbore to provide a shearing force causing physical erosion to the gelled treatment fluid.

* * * * *

UNITED STATES PATENT AND TRADEMARK OFFICE
CERTIFICATE OF CORRECTION

PATENT NO. : 11,104,839 B2  
APPLICATION NO. : 16/741068  
DATED : August 31, 2021  
INVENTOR(S) : Li et al.

Page 1 of 1

It is certified that error appears in the above-identified patent and that said Letters Patent is hereby corrected as shown below:

In the Claims

In Claim 2, Column 12, Line 66, the claim language reads:
"the cros slinking agent are combined"
It should read:
--the crosslinking are combined--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*